(12) United States Patent
Jungnickel et al.

(10) Patent No.: US 10,326,524 B2
(45) Date of Patent: Jun. 18, 2019

(54) SYSTEM AND METHOD FOR PROVIDING A WIRELESS COMMUNICATION WITH A MOBILE DEVICE

(71) Applicant: Fraunhofer-Gesellschaft zur Foerderung der angewandten Forschung e.V., Munich (DE)

(72) Inventors: Volker Jungnickel, Berlin (DE); Hagen Woesner, Berlin (DE); Maria de la Luz Fernandez Del Rosal, Berlin (DE); Anagnostis Paraskevopoulos, Berlin (DE); Dominic Schulz, Berlin (DE); Ronald Freund, Berlin (DE); Liane Termer, Berlin (DE); Jonas Hilt, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/972,425

(22) Filed: May 7, 2018

(65) Prior Publication Data

US 2018/0254826 A1    Sep. 6, 2018

Related U.S. Application Data

(63) Continuation of application No. PCT/EP2016/077354, filed on Nov. 10, 2016.

(30) Foreign Application Priority Data

Nov. 10, 2015   (EP) ..................................... 15193978

(51) Int. Cl.
*H04B 10/114*   (2013.01)
*H04W 28/02*    (2009.01)
(Continued)

(52) U.S. Cl.
CPC ..... *H04B 10/1143* (2013.01); *H04B 10/1149* (2013.01); *H04W 28/0247* (2013.01);
(Continued)

(58) Field of Classification Search
CPC . H04B 10/1143; H04B 10/1149; H04W 36/06
See application file for complete search history.

(56) References Cited

U.S. PATENT DOCUMENTS

| 2008/0080863 A1 | 4/2008 | Sauer et al. |
| 2013/0201841 A1* | 8/2013 | Zhang ............... H04L 1/1607 370/252 |

(Continued)

FOREIGN PATENT DOCUMENTS

EP   2434835 A1   3/2012

OTHER PUBLICATIONS

"Technical Consideration Document", TG7r1: Technical Considerations Document, available: https://mentor.ieee.org/802.15/dcn/15/15/15/0492-05-007a-technical-considerationsdocument.docx.
(Continued)

*Primary Examiner* — Dzung D Tran
(74) *Attorney, Agent, or Firm* — Perkins Coie LLP; Michael A. Glenn

(57) ABSTRACT

A system for providing a wireless communication with a mobile device includes a plurality of frontends coupled to a central point, each of the plurality of frontends configured to provide for a wireless communication with the mobile device, and a network controller coupled to the central point. The network controller includes a data flow control device configured to control the data flow between each of the frontends and the central point, the data flow control device being configured to operate responsive to a control signal from the network controller, the control signal indicating which of the plurality of frontends serves the mobile device.

13 Claims, 9 Drawing Sheets

(51) Int. Cl.
*H04W 36/06* (2009.01)
*H04W 36/30* (2009.01)
*H04W 36/38* (2009.01)
*H04W 84/12* (2009.01)
*H04W 88/06* (2009.01)
*H04W 88/08* (2009.01)
*H04W 88/10* (2009.01)
*H04W 92/12* (2009.01)

(52) U.S. Cl.
CPC ........... *H04W 36/06* (2013.01); *H04W 36/30* (2013.01); *H04W 36/38* (2013.01); *H04W 84/12* (2013.01); *H04W 88/06* (2013.01); *H04W 88/085* (2013.01); *H04W 88/10* (2013.01); *H04W 92/12* (2013.01)

(56) References Cited

U.S. PATENT DOCUMENTS

| | | | |
|---|---|---|---|
| 2013/0202309 A1 | 8/2013 | Park et al. | |
| 2014/0293884 A1* | 10/2014 | Larsson | H04L 1/0073 370/329 |
| 2014/0328182 A1* | 11/2014 | Gao | H04W 28/08 370/236 |
| 2015/0049649 A1* | 2/2015 | Zhu | H04W 24/02 370/277 |
| 2015/0172985 A1 | 6/2015 | Gangadhar et al. | |
| 2015/0215879 A1* | 7/2015 | Zhu | H04W 56/0015 370/350 |
| 2015/0303950 A1* | 10/2015 | Shattil | H04B 1/0003 370/328 |
| 2016/0095033 A1* | 3/2016 | Kadiri | H04L 47/32 370/331 |
| 2016/0337909 A1* | 11/2016 | Cai | H04W 36/0033 |

OTHER PUBLICATIONS

Jungnickel, V., et al., "Localized SC-FDMA with Constant Envelope", In Proc. IEEE Int. Symp. on Personal, Indoor and Mobile Radio Comm. (PIMRC), London, UK, Sep. 8-11, 2013, 9 pages.

Jungnickel, V., et al., "SC-FDMA Waveform Design, Performance, Power Dynamics and Evolution to MIMO", in Proc. IEEE International Conference on Portable Information Devices (POR-TABLE), May 2007, 6 pages.

* cited by examiner

| light source | Laser | Laser | Laser/LED | LED | LED | LED |
|---|---|---|---|---|---|---|
| bandwidth [MHz] | 1.000 | 600 | 200 | 100 | 20 | 10 |
| sample rate [MS/s] | 2.000 | 1.000 | 400 | 200 | 50 | 25 |
| sample time [ns] | 0.5 | 1 | 2.5 | 5 | 20 | 40 |
| carrier spacing [kHz] | 195.32 | 195.32 | 195.32 | 195.32 | 195.32 | 195.35 |
| carriers in use | 4750 | 2850 | 950 | 450 | 90 | 45 |
| IFFT size | 3x2.048 | 2x2.048 | 2048 | 1.024 | 256 | 128 |
| CP [samples] | 640, 320 | 320, 160 | 128, 64 | 64, 32 | 16, 8 | 8, 4 |
| CP [ns] | | | 320, 160 | | | |
| symbol duration [µs] | | | 5.12 | | | |
| symbol + CP [ns] | | | 5.44, 5.28 | | | |
| peak rate [Mb/s] (12 bit/carrier, r=20/21) | 9.975, 10.281 | 5.985, 6.168 | 1.995, 2.056 | 945, 1.028 | 189, 257 | 95, 103 |
| min. rate [Mb/s] (1 bit/carrier, r=1/6) | 145 | 87 | 35 | 14 | 3 | 1.4 |

Fig. 9

SYSTEM AND METHOD FOR PROVIDING A WIRELESS COMMUNICATION WITH A MOBILE DEVICE

CROSS-REFERENCES TO RELATED APPLICATIONS

This application is a continuation of copending International Application No. PCT/EP2016/077354, filed Nov. 10, 2016, which is incorporated herein by reference in its entirety, and additionally claims priority from European Application No. 15193978.2, filed Nov. 10, 2015, which is incorporated herein by reference in its entirety.

The present invention concerns the field of wireless communication, more specifically a system and a method for providing a wireless communication with a mobile device. Embodiments relate to a system for a mobile optical wireless communication.

BACKGROUND OF THE INVENTION

A system for optical wireless communication (OWC) is a wireless communication system using optical wavelengths. The OWC may be classified into image sensor communications enabling optical wireless communications using an image sensor as a receiver, high-rate photodiode (PD) communications using a high-speed, bidirectional network to enable mobile wireless communications using light and a high-speed photodiode receiver, and low-rate PD communications which refer to a wireless light identification (ID) system using an LED as a low speed photodiode receiver. High-rate PD communications may include:
- indoor office/home applications, like in conference rooms, general offices, shopping centers, airports, railways, hospitals, museums, aircraft cabins, libraries, etc.,
- applications in data center/industrial establishments and secure wireless applications, like manufacturing cells, factories, hangars, etc.,
- applications in vehicular communications, like vehicle-to-vehicle communications and vehicle-to-infrastructure communications, and
- applications in a wireless backhaul network, like in a small cell backhaul network, a surveillance backhaul network or applications for local area network (LAN) bridging.

An optical wireless communication system operating in the above referenced high-rate PD communications mode allows for a networked mobile communication using multiple distributed semiconductor light sources, like light emitting diodes (LEDs) or lasers, for example, for the first three applications mentioned above, as well as a single-link high-speed communication for the last mentioned application. The high-rate PD communications involve the following:
- packet-based transmission of data,
- an efficient use of the available optical bandwidth of a given luminaire,
- data rates scalable from 1 Mbps to 10 Gbps,
- latencies between 1 ms and 30 ms,
- a dimming support,
- allow for asymmetric communications,
- provide for the handling of the handover and interference coordination,
- the ability to coexist with ambient light and other lighting systems,
- support MIMO and other cooperative signaling process with negligible impact on latency,
- provide an efficient and reliable feedback and control channel for adaptive transmissions, multiple user support, MIMO support, cooperative signal processing, variable current modulation schemes, and
- defined metrics for reporting to high layers in the communication protocol using an open interface.

The above referenced considerations for a high-rate PD communication mode are described, for example, in reference [1]. Further, a coordinated multipoint transmission using a signaling on the X2 interface is described, for example, in reference [2].

According to an embodiment, a system for providing an optical wireless communication with a mobile device may have: a plurality of optical frontends coupled to a central point, each of the plurality of optical frontends configured to provide for an optical wireless communication with the mobile device; and a network controller coupled to the central point, wherein the network controller includes a data flow control device configured to control the data flow between each of the optical frontends and the central point, the data flow control device being configured to operate responsive to a control signal from the network controller, the control signal indicating which of the plurality of optical frontends serves the mobile device, wherein an interface from the plurality of optical frontends to the network controller is configured to exchange control signals between the network controller and the plurality of optical frontends, wherein a plurality of mobile devices communicate with the optical frontends using coordinated links, wherein the mobile devices and the optical frontends estimate the physical interference channel before a coordinated transmission and respective metrics reports are conveyed by the optical frontends to the network controller as an input for the interference coordination and handover, and wherein, depending on the link situation, the network controller is configured to initiate a handover event by rerouting traffic paths between the network controller and the plurality of optical frontends and to control the transmission of the mobile devices and the optical frontends to minimize an interference.

In accordance with the inventive approach, embodiments concern an optical wireless communication. An optical wireless link in an optical wireless communication system only has a real-valued non-negative channel. However, assuming that a sufficiently high constant bias current is applied, the optical wireless channel may be modeled as a real-valued multipath channel with additive white Gaussian noise so that algorithms may be applied that may similar to those used for mobile radio transmissions.

In accordance with embodiments of the present invention, multiple optical wireless links are provided which have an overlapping coverage area within a cell of the communication system to provide for a coordinated transmission. This may cause an inter-cell interference so that cooperative transmission algorithms may be applied.

Further, in an optical wireless communication system mobility management of mobile users may be needed so as to allow for a correct handover and for interference coordination. In accordance with the inventive approach, this achieved by adopting the cloud radio access network (C-RAN) architecture known from mobile radio applications also to optical wireless communications. The C-RAN architecture provides a central control (CC) functionality for handling the handover management and the interference management. In accordance with the inventive approach, adopting the C-RAN architecture for optical wireless communications allows placing the central control functionality in a "natural" network node. For example, when considering an optical wireless communication system as it might be used in an industrial production hall or in a home, there will be central points where all signals of the light sources (=the wireless access points for the optical wireless communication system) come together. In an industrial environment, such central points may be certain aggregation nodes like switches and routers in a common IT infrastructure, and within a home, the central point may be a common fuse box. The central point may host the central control functionality for handover and interference management, which is somehow similar to a local cloud. The CC may also provide for data processing capabilities by exploiting its location and the close proximity to the switches/routers in an IT infrastructure allowing for a faster data processing when compared to a processing originating from the frontend. Further, at the CC multiple signals from multiple frontends may be jointly processed.

In accordance with the inventive approach, the optical frontends provide the interface to the CC, for example via existing network paths in the PHY and MAC layers. As mentioned above, the CC is located at "natural" network nodes, i.e. is located nearby the actual wireless frontends (other than central control elements in a radio based system which are typically situated hundreds of kilometers away from the user), so that a very fast information exchange is possible allowing for a fast interference coordination if users are mobile and the channel to serving interfering cells changes quickly. A low-latency handover from one access point to another access point is also enabled.

In accordance with embodiments, when transmitting a packet over the wireless link, the corresponding routing information is stamped at the Ethernet transport layer at as a VLAN (virtual local area network) address into each individual packet. The links from the CC to the frontends are assumed to be pre-configured for each access point, like an aggregation node inside a local IT network, so that, by changing the stamp used at the CC, the packet will go another way. For example, when considering an Ethernet transport layer with a largest packet size to be 1500 byte and a lowest data rate to be 1 Mbps, 12 ms are needed to transport the largest packet over the wireless link. When considering a data rate of 12 Mbps, the largest packet may be transferred in 1 ms so that, when signaling to a user for which the access point changes (handover needed), the route for the next packet may be changed after that 1 ms, and even less at higher speed. In a similar way, when implementing a corresponding functionality also in the wireless terminal, the route of uplink packets may be rapidly changed.

By introducing a centralized controller (CC) located at a local node, all decisions and low-layer routing operations, for example needed for instantaneous interference management and handover, may be made locally, thereby achieving a low latency for mobile data links without external control from a core network. Further, all transport may be Ethernet-based so that existing low-cost technology may be used. The security and queue functionality implemented in the centralized controller applies stamps to each individual packet according to control information received from the controller and, may also be inside the mobile terminal, so that fast routing of packets between the controller and the mobile terminal in a downlink connection and in uplink connection is possible even when the access points for the mobile user in the wireless communication system change.

BRIEF DESCRIPTION OF THE DRAWINGS

Embodiments of the present invention will be detailed subsequently referring to the appended drawings, in which:

FIG. 1 shows embodiments of a network architecture as it may be used in accordance with the present invention, wherein FIG. 1(a) shows a standalone link between a user device and an access point of an optical wireless communication system, FIG. 1(b) shows a multiuser link network architecture in which a plurality of user devices are in communication with a common access point, and FIG. 1(c) shows a network architecture using coordinated links.

FIG. 6 shows examples for single-carrier modulation schemes, wherein FIG. 6(a) shows a pure DFT precoding, FIG. 6(b) shows a root-raised cosine filter added in the frequency domain, and FIG. 6(c) shows a Gaussian filter and a minimum-shift keying (MSK) modulation added in the time domain.

FIG. 9 shows an example table indicating for different light sources the respective parameters as they may be used when applying the adaptive OFDM PHY in accordance with embodiments of the present invention.

DETAILED DESCRIPTION OF THE INVENTION

Figure 1:
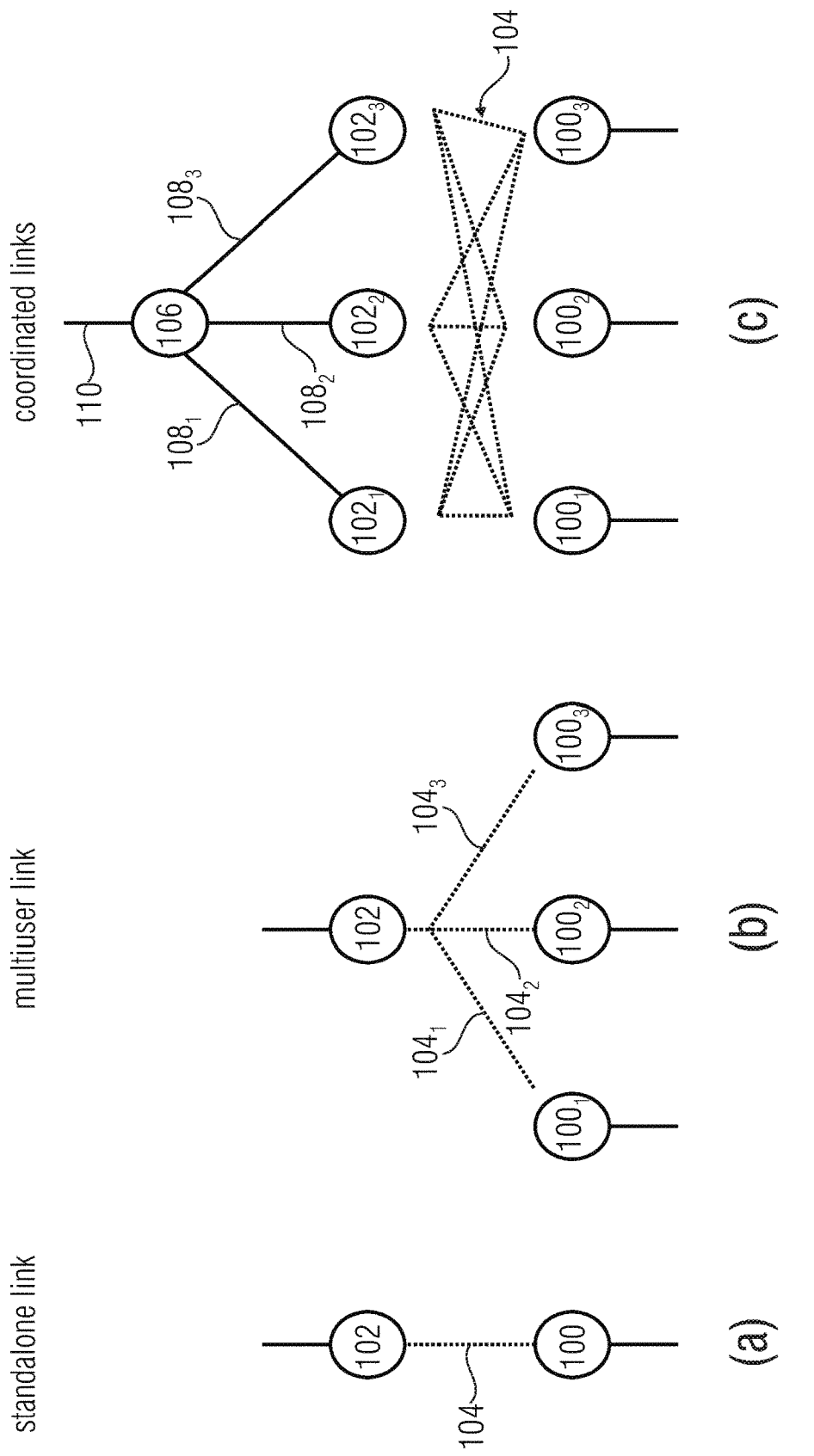

FIG. 1 shows embodiments of a network architecture as it may be used in accordance with the present invention. In accordance with embodiments, full and half duplex are both supported. Half duplex may be combined with same wavelength or different wavelengths in both directions. In half duplex, time sharing may be unequal for both link directions, so that statistical multiplexing gains and higher peak rates in each direction are possible. Full duplex is typically combined with different wavelengths in uplink and downlink (e.g. visible light in the downstream, infrared in the upstream). The same wavelength may be used in the directive backhaul scenario concerning applications in a wireless backhaul network. A super-frame (SF) may be introduced in general. In the stand-alone mode, UDs may access the channel randomly, i.e. contention-based. In the multiuser links mode, UDs may access the channel either contention-based, or be assigned individual time slots (time-division multiple access, TDMA) and/or individual frequency sub-bands (frequency-division multiple FDMA). In a MIMO link, multiple UDs may be assigned the same time-frequency resource while data are delivered on different spatial sub-streams, what is a.k.a. as space-division multiple access (SDMA). In the coordinated links mode, adjacent APs with overlapping coverage are mutually coordinated to optimize the performance.

FIG. 1(a) shows a standalone link between a user device 100 and an access point 102 of an optical wireless communication system, and a communication between the user device 100 and the access point 102 is indicated by the dotted line 104. In accordance with the standalone (SA) link, a physical layer (PHY) and a media access control (MAC) layer support the bidirectional wireless transmission 104 between the user device 100 and the access point 102 which may be a further user device (UD). The PHY and MAC layers support, besides the transmission 104, an automatic link setup and feedback path for a closed-loop adaptive transmission.

The standalone link between two UDs is used in ad-hoc situations if no device with AP functionality is available. As multiple standalone links may coexist in the same area, like in vehicle-to-vehicle communications, interference coordination is taken into account.

At the beginning of the super-frame, if no AP is available, the UD sends a short beacon frame which contains only the preamble and the header. The beacon allows the UDs to identify another UD and to learn its physical properties (number of LEDs, colors, Ethernet MAC and IP addresses, local time at the UD etc.).

In the standalone mode, UDs access the network randomly, i.e. contention-based (at time offset 0). For such initial access, UDs listen before they talk. The first UD sends a short random access (RA) frame that contains only a preamble and a header. The RA frame allows another UD to identify the first UD, to learn its physical properties (number of LEDs and colors, Ethernet MAC and IP addresses etc.) as well as the properties of the transmission channel. In case the transmission is completed, in order to save energy, a UD may send another short RA frame after a certain period of time, in order to inform the other UD that it is going to idle mode. In that case the transmitter is switched off, and the receiver goes to the lowest bandwidth mode.

CSI feedback may be provided if a UD detects a significant change of the channel state which implies a desirable change of the transmission mode. Using CSI feedback, the source UD is informed about a transmission mode that may be decoded by the destination UD reliably. The CSI feedback may be provided in both link directions. The CSI feedback may be provided in the last time slot in a super-frame, using listen before talk. In this way, the feedback delay is minimized before the data transmission starts in the next frame.

The PHY measures the signal-to-interference-and-noise ratio (SINR) on each subcarrier. Any appropriate method for measuring the SINR may be used to provide reasonable CQI reports and to ensure that the data delivered in the requested modulation and coding scheme may be received with negligible probability of error. The transmitter may reduce the rate in general if there are too many packets reported with errors.

A common approach to estimate the SINR is to pass the reference symbols provided for channel estimation also through the frequency-domain (and eventually MIMO) equalizer. Per stream, the deviation of the received constellation from the transmitted one being known also at the receiver is then measured per subcarrier. The deviation is normalized so that the error vector magnitude (EVM) may be measured.

$$EVM_n = \left(\frac{|x_n - x_n^o|^2}{|x_n^o|^2}\right) \times 100\%,$$

where $x_n$ is the received complex-valued signal constellation and $x_n^o$ is the desired complex-valued signal constellation. However, this is a snapshot only and averaging over multiple symbols is needed. In case that the subsequent data block is received free of error, i.e. the cyclic redundancy check (CRC) has been passed, one way is to re-encode the data and pass them through the constellation mapper, so that more reference points $x_n^o$ may be obtained. There is an inverse relationship between the SINR and EVM $$SINR_n = \frac{100\%}{EVM_n}$$

The procedure used here may be used if reference signals are provided on each subcarrier. A more sophisticated SINR estimation method may be needed in the CO mode.

The quantization of the SINR e.g. in steps of 1 dB yields the channel quality indicator (CQI). The CQI is then an integer number, ranging e.g. from 0 to 63 using 6 bits, and values below 0 dB may be set to 0 to indicate that no transmission is possible on this particular subcarrier.

The PHY creates an ordered list containing the CQIs for all subcarriers. The list is extracted from the PHY and transported over the reverse link as a data block in a normal PHY frame. A separate CQI list is reported for each parallel stream in an optical MIMO or WDM link.

For a reliable transmission of feedback packets, a robust modulation scheme is used. The feedback packets are e.g. transported with a reduced bandwidth, e.g. in the 10 MHz mode, thus using the lowest SCs, as this is not otherwise negotiated between the transmitter and receiver.

Error detection is an integral part of the complex, soft-decision LDPC decoder. If an erroneous packet is received, via the reverse link, the transmitter may be asked by the receiver to retransmit this packet. Selective Repeat (SR) is known as an efficient implementation of automatic repeat request (ARQ). In order to reduce latency, SR is implemented in before FEC encoding and after FEC decoding at the transmitter and receiver, accordingly.

For SR, buffering of already transmitted data in the MAC is done at the transmitter. In case of an erroneous packet, the receiver retransmits short negative acknowledgement (NACK) fame, containing only the preamble and the header with the NACK message and the number of the packet to be retransmitted. Retransmission of the packet is implemented immediately, i.e. SR packets are prioritized with respect to other data. The reordering of packets is implemented so that the delay of packet delivery to higher layers is minimized.

FIG. 1(b) shows a multiuser link network architecture in which a plurality of user devices $100_1$ to $100_3$ are in communication with a common access point 102, as is indicated by the optical wireless communications $104_1$ to $104_3$. The access point 102 may be a UD which serves multiple other UDs $100_1$ to $100_3$ in parallel. The access point (AP) 102 aggregates traffic from the multiple UDs $100_1$ to $100_3$ and coordinates the wireless transmission. The PHY and MAC layer may support a spectrally efficient MU transmission. In accordance with embodiments, the feedback paths of the UDs $100_1$ to $100_3$ to the AP 102 are made orthogonal, and the UDs and AP may be time-synchronized, for example by a FDMA (Frequency-Division Multiple Access). Further, a control channel may be used that is broadcast to all UDs $100_1$ to $100_3$ so as to inform them about the granted transmission resources in both link directions, i.e., in the uplink direction and the downlink direction. The granted transmission resources in the respective link directions may include information about a time slot when operating in a TDMA (Time-Division Multiple Access) mode, or a frequency sub-band in the FDMA mode. Dynamic bandwidths sharing among multiple UDs may be supported in a contention-free manner in both directions.

In the multiuser link transmission is coordinated by an AP. UDs access the channel randomly, i.e. contention-based, or transmission is coordinated using time-division multiple access (TDMA), frequency-division multiple access (FDMA) and space-division multiple access (SDMA).

The first time slot in the super-frame is reserved for contention-based multiple access (CBMA). In this slot, the AP sends a short beacon frame at first containing only the preamble and a header. The beacon frame allows the UDs to identify the AP and to learn its physical properties (number of LEDs and colors, Ethernet MAC and IP addresses, local time at the AP etc.).

Subsequently, UDs may access the channel randomly (at time offset 0) and inform the AP that they want to access the network. Using CBMA, UDs listen before they talk. The UD sends a short random access (RA) frame which contains only a preamble and a header which allows the AP to identify the UD and to learn its physical properties (number of LEDs and colors, Ethernet MAC and IP addresses etc.).

In case a collision between multiple UDs is detected, a UD stops its RA frame transmission and retransmits the RA frame at another time offset. The time offset for the RA frame transmission is measured in the local time at the UD, which is regularly synchronized with the AP by using the preamble. The time offset $T_{offset}=O*T_0$ of the RA frame is an integer multiple denoted by O of a constant offset denoted by $T_0$.

In case a transmission is completed, in order to save energy, a UD may send another short RA frame after a certain period of time, in order to inform the AP that it is going to idle mode. In that case the transmitter is switched off, and the receiver goes to the lowest bandwidth mode.

CSI feedback may be provided if the AP or UD detect a significant change of the channel state which implies a desirable change of the transmission mode.

Using CSI feedback in the downlink, the AP is informed about a transmission mode that may be decoded by the UD reliably. In case that the UD requests a time slot for uplink transmission, the CSI feedback is also provided from the AP to the UD.

For CBMA, CSI feedback is provided randomly in the last time slot in a superframe, using listen before talk.

For TDMA, FDMA and SDMA, in the last time slot of a super-frame, the AP informs all associated UDs at first about the order of CSI feedback transmission, being identical to the order of data transmission in the next superframe.

After being informed about the order of feedback transmission, UDs reply with their individual CSI feedback transmission to the AP in the assigned order.

As a specific feature of FDMA and SDMA, a so-called resource map (RM) is broadcast from the AP to all UDs as a data packet in a specific control frame. This packet informs the UDs per time slot, per spatial stream and per frequency subband (if applicable) what the destination UD in the downlink is and what modulation and coding scheme is being used (downlink RM). Moreover, this packet informs the UDs per time slot, per spatial stream in the uplink and per frequency subband (if applicable), what the source UD in the uplink is and what modulation and coding scheme is being used (uplink RM). Sophisticated rules are applied to minimize the control overhead while targeting reliable transmission of the control information.

UDs may have different path loss and distance for the AP. Thus, longer CP or ranging are needed. The random time offset, which is however on a fixed grid, enables the AP to measure the roundtrip time for each UD. In the last time slot of the superframe, the AP informs all UDs about their transmit power and the number of samples by which their transmission shall be individually delayed, so that the signals arrive nearly simultaneously and the mutual delays between UD signals is much smaller than the CP duration.

FIG. 1(c) shows a network architecture using coordinated links. A plurality of user devices $100_1$ to $100_3$ communicate, as is shown at 104, with one or more access points $102_1$ to $102_3$. The access points $102_1$ to $102_3$, in turn, are coupled to a coordinator 106, as is indicated by the lines $108_1$ to $108_3$. The coordinator 106 may be further connected to other network resources, as is indicated at 110. In accordance with examples, the access points $102_1$ to $102_3$ are also referred to as frontends of the optical wireless communication system, and embodiments of the present invention define the optical wireless link 104 between a UD $100_1$ to $100_3$ and one of the access points $102_1$ to $102_3$ so as to provide/define an interface to the coordinator 106 to allow for a coordinated transmission, as shall be described in further detail below.

In the CO mode, a feedback packet may contain additional information, over what path in the network this information is conveyed, and to what other device. This is indicated by an IP address, or an Ethernet MAC address plus a virtual local area network (VLAN) identifier (VID).

The $SINR_n$ on each subcarrier is measured in dB and obtained as $$SINR_n = 10\log_{10}\left(\frac{|H_n^i|^2}{\Sigma_{\forall j\neq i}|H_n^j|^2 + P_n^{noise}}\right)$$

The network topology of FIG. 1(c) using coordinated (CO) links allows serving of multiple UDs $100_1$ to $100_3$ by multiple APs $102_1$ to $102_3$. Interference may be coordinated by the coordinator 106, also referred to as a network coordinator (NC). The NC 106 may aggregate the traffic from multiple UDs $100_1$ to $100_3$ via multiple APs $102_1$ to $102_3$. The NC 106 reroutes the traffic paths between the NC 106 and the APs $102_1$ to $102_3$ in case of a handover and controls the transmission of all APs and UDs to minimize an interference. The UDs and the APs estimate the physical interference channel before the CO transmission and the respective metrics reports are conveyed by the APs over the fronthaul to the NC as an input for the interference coordination and handover.

Additionally, knowing the interference conditions is advantageous as the transmissions may be optimized due to the reduced or avoid interference. The PHY and MAC layers support the handover and interference management such that all APs $102_1$ to $102_3$ are operated in a time-synchronized manner, the UDs $100_1$ to $100_3$ estimate the downlink interference channel, and the corresponding metrics reports are conveyed via the APs $102_1$ to $102_3$ over the connections $108_1$ to $108_3$, also referred to as the fronthaul, to the NC 106, and the APs $102_1$ to $102_3$ estimate an uplink interference channel, and the corresponding metrics reports are conveyed via the fronthaul $108_1$ to $108_3$ to the NC 106. Depending on the link situation, a handover event may be initiated by the NC 106, for example by rerouting the fronthaul traffic and controlling the interference.

The coordination performed by the NC 106 may be performed in any suitable way, for example the NC 106 may be a proprietary device, however, the interface from the APs to the NC via the fronthaul is defined in accordance with the inventive approach so as to allow for a exchange of control signals between the NC 106 and the frontends 102.

The network architecture as described above with reference to FIG. 1 may be used for the above summarized applications, namely indoor office/home applications, like in conference rooms, general offices, shopping centers, airports, railways, hospitals, museums, aircraft cabins, libraries, etc., applications in data center/industrial establishments and secure wireless applications, like personalized manufacturing cells, factories, hangars, etc., applications in vehicular communications, like vehicle-to-vehicle communications and vehicle-to-infrastructure communications, and applications in a wireless backhaul network, like in a small cell backhaul network, a surveillance backhaul network or applications for local area network (LAN) bridging.

A bidirectional, continuous or packet-based transfer mode may be implemented with a data rate, dependent on the use case, between 1 Mbit/s to 10 Gbit/s. A transceiver with a small bandwidth may synchronize with another transceiver having a higher bandwidth, and vice versa, exchange control information and data. Therefore, links may be operated at a low bandwidth during link setup, and the bandwidth may be increased if possible. A high-bandwidth PHY may support the variable data rates from 1 Mbit/s to 10 Gbit/s by means of a scalable design. In all PHY modes, the subcarrier spacing and cyclic prefix (CP) may be the same. The used bandwidth is scalable by adapting the number of used subcarriers. An interoperability among all PHY modes is enabled by the above mention synchronization. A bandwidth adaptation is supported to operate the link at the lowest bandwidth during link setup, and uses subcarriers at low frequencies only to transmit control information, before switching eventually to a higher bandwidth mode.

The waveform applied may be based on an adaptive OFDM waveform with an optional precoding, or on an adaptive, real-valued OFDM waveform denoted as DC-biased discrete multi-tone (DMT). The used bandwidth may be scalable by means of a variable number of subcarriers while keeping the same carrier spacing and cyclic prefix (CP) in all bandwidth modes. Devices with a different bandwidth may be interoperable. Moreover, an adaptive bit- and power loading may be supported using variable modulation formats on each subcarrier or on groups of subcarriers, depending on the channel-, interference- and noise-characteristics of the OWC link. The OFDM waveform may be extended by an optional preprocessing in order to improve energy efficiency.

An efficient use of the optical bandwidth may be achieved by means of a closed-loop adaptive transmission and MIMO (Multiple Input Multiple Output). This provides robustness in a multi-path propagation channel. Moreover, the PHY and MAC layers may be defined so that latencies less than 1 ms are achievable. For example, a high-bandwidth PHY supports the efficient use of the optical bandwidth by means of a highly scalable PHY layer design, together with the closed-loop adaptive transmission and the efficient support of MIMO cooperative transmission and relaying. This combination provides robustness in the multi-path propagation channel, in case of mobility and in interference scenarios.

Dimming for indoor office/home applications, for applications in data center/industrial establishments and secure wireless applications, and for applications in vehicular communications is provided, e.g., by the high-bandwidth PHY. Due to the adaptive transmission, the coexistence with ambient light and other light sources is supported.

A robust transmission may be provided in the high-bandwidth PHY to provide a high availability for all channel conditions. For example, an advanced wireless networking may be supported in the S and CO topologies. A link may be available in line-of-sight (LOS) scenarios and also in non-LOS (NLOS) scenarios, at a low signal-to-noise ratio (SNR) and in interference-limited scenarios.

In accordance with embodiments metrics reporting is implemented in a way that the network controller, independent of the specifics of how it is implemented, may receive the control signals from the frontend or send the signals to the frontend so as to allow for a reliable communication. For example, the high-bandwidth PHY may provide metrics to be reported for efficient operation of higher layer protocols. Depending on the topology, the metrics to be reported may comprise:

the signal strength of the strongest APs and UDs,
the frequency-selective signal-to-interference-and-noise ratio (SINR),
the channel state information (CSI) for strongest APs and UDs, and
an error vector magnitude (EVM) versus the frequency.

Short time intervals may be provided between successive metrics reports and control messages to allow for a fast adaptation to the time-varying wireless channel as well as a low latency.

Figure 2:
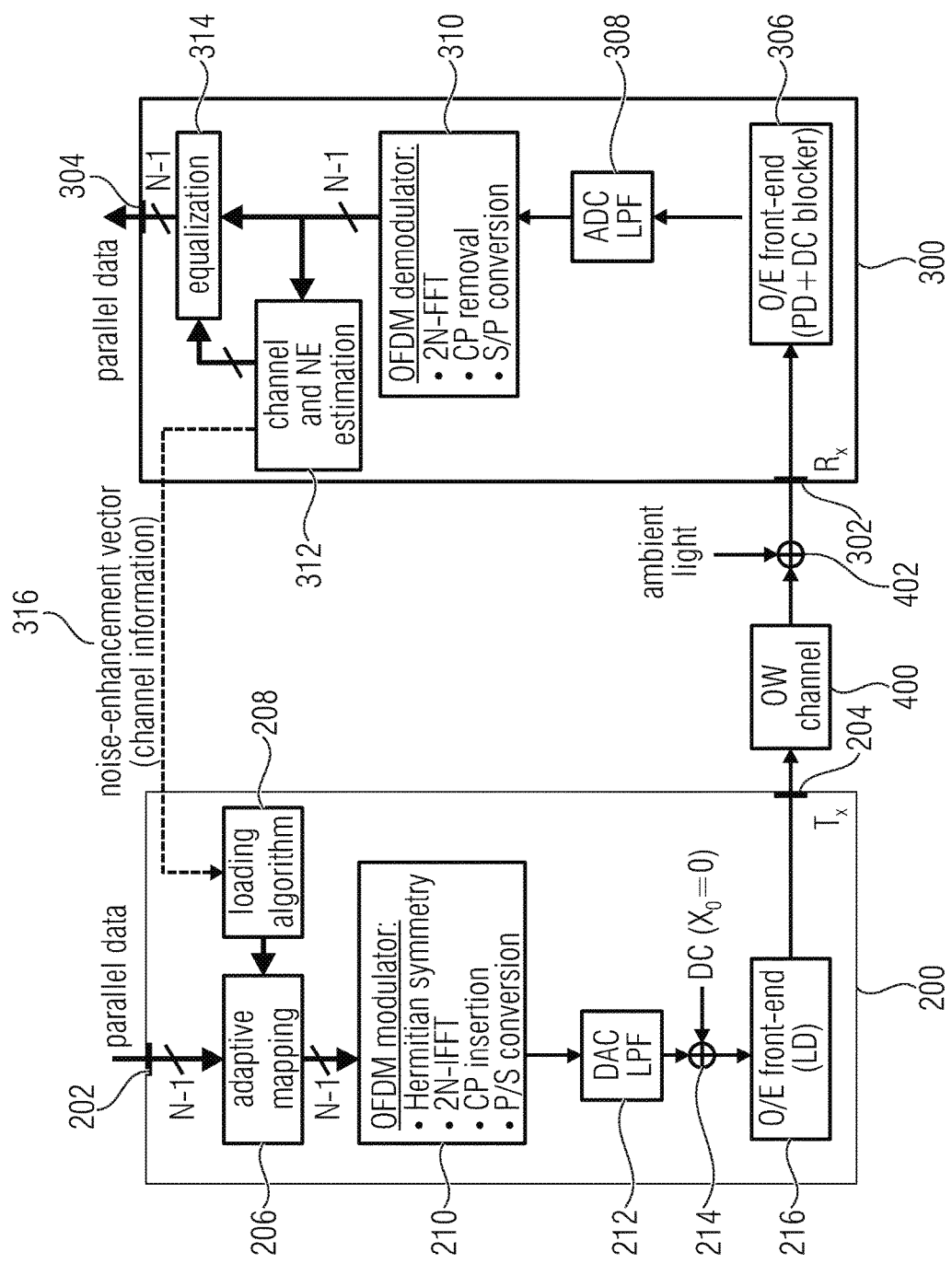
FIG. 2 shows an example for implementing an adaptive OFDM PHY layer in accordance with the inventive approach.

FIG. 2 shows an example for implementing an adaptive OFDM PHY layer in accordance with the inventive approach. FIG. 2 is a schematic representation of a transmitter (Tx) 200 having an input 202 for receiving parallel data, and an output 204. The parallel data is subjected to an adaptive loading 206 operating on the basis of a loading algorithm 208. The adaptively mapped input data is applied to an OFDM modulator 210. The output of the OFDM modulator 210 is applied to a digital/analog converter and a lowpass filter 212 converting the digital signal into the analog domain. At 214 the signal is subjected to a bias DC and applied to an optical/electrical (O/E) frontend 216 of the transmitter 200 providing the signal to be transmitted at the output 204. FIG. 2 further shows a schematic representation of a receiver Rx 300 having an input 302 and an output 304. At the input 302, a signal is received and forwarded to an O/E front-end 306 of the receiver 300. The received and processed analog signals are applied to the analog/digital converter 308 so as to be transformed into the digital domain. The digital signals are applied to an OFDM demodulator 310 outputting the data signals which are applied to a channel and noise estimation block 312 as well as to an equalization block 314 which, based on information from the channel and noise estimation block 312, outputs the parallel data at the output 304. Further, as indicated at 316, the channel and noise enhancement estimation block 312 forwards a noise enhancement vector (channel information) to the loading algorithm 208 of the transmitter 200. The signal output by the transmitter 204 is transmitted via an optical wireless channel 400, and the signal received at the input 302 of the transmitter 300 also includes ambient light 402 that is added to the optical signal provided by the transmitter 200.

In accordance with embodiments, the adaptive OFDM PHY layer is such that, at the transmitter 200, the input data 202 is transported via orthogonal subcarriers. Each data symbol may carry one or more bits and is mapped onto a constellation point, according to a variable modulation format for each subcarrier. A Hermitian symmetry operation is performed to create a real-valued waveform. An OFDM symbol is generated by feeding symbols in the frequency domain into the inverse fast Fourier transform (IFFT) followed by the insertion of a cyclic prefix (CP). The output of the OFDM modulator 210 is then clipped in the digital domain and passed through the digital/analog-converter and the lowpass filter (LPF) 212. The bias DC is added to ensure a unipolar all positive signal before it is used for intensity modulation of the optical source at the frontend 216, for example for modulating a light emitting diode (LED) or a laser diode (LD). The optical signal is transmitted to the receiver 300 and following the conversion from the optical signal to the electrical signal and following the signal detection, inverse operations are performed at the receiver 300, more specifically in the OFDM demodulator. The frequency-domain equalizer (FDE) 314 is used to reconstruct the receive constellation points on each sub-carrier after passing them through the OWC channel 400. The desired mapping of the information bits onto the sub-carriers is sent by the receiver to the transmitter over the reverse link.

In the embodiment described with reference to FIG. 2, the metrics reporting includes the transmission of the noise-enhancement vector. The power-and bit loading algorithm 208 determines the power and modulation formats for the data transport on each used subcarrier. The loading algorithm may maximize the throughput assuming a fixed power budget so that a predefined bit error rate (BER) is achieved before any forward error correction (FEC).

In accordance with embodiments, the above described OWC PHY may be based on the G.hn standard (home grid-standard) in the coax mode for 50, 100 and 200 MHz bandwidth. Additional modes maybe added for a scalability towards lower and higher bandwidths and, for a coordinated wireless topology, as described with reference to FIG. 1(c), additional features may be added, as shall be discussed below. The OWC PHY may use the adaptive OFDM waveform in both the uplink and downlink directions with the following extensions:

the waveform is non-negative and real-valued
a bias is added and clipping, if needed, is implemented in the digital domain
optionally a signal-carrier modulation may be used to improve the power efficiency and to support dimming.

Figure 3:
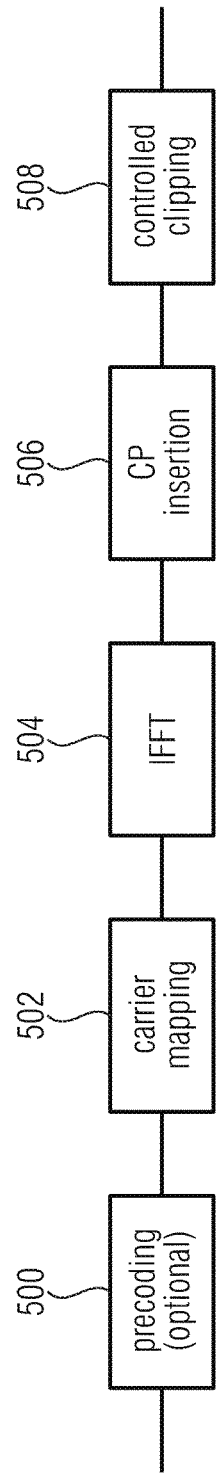
FIG. 3 shows an example of the generation of an OFDM signal as it may be performed by the OFDM modulator in FIG. 2.

FIG. 3 shows an example of the generation of an OFDM signal as it may be performed by the OFDM modulator 210 in FIG. 2. In FIG. 3 the transmission of a block of 2N data symbols is assumed. An optional pre-coding 500 may be used for generating a single-carrier modulation scheme based on OFDM so as to improve power efficiency and support dimming. The signal is then passed through a carrier mapping unit 502 used for precoding and Hermitian symmetry. The IFFT 504 is then performed and at 506 the CP is added before, at 508, a controlled clipping is performed in the digital domain.

Figure 4:
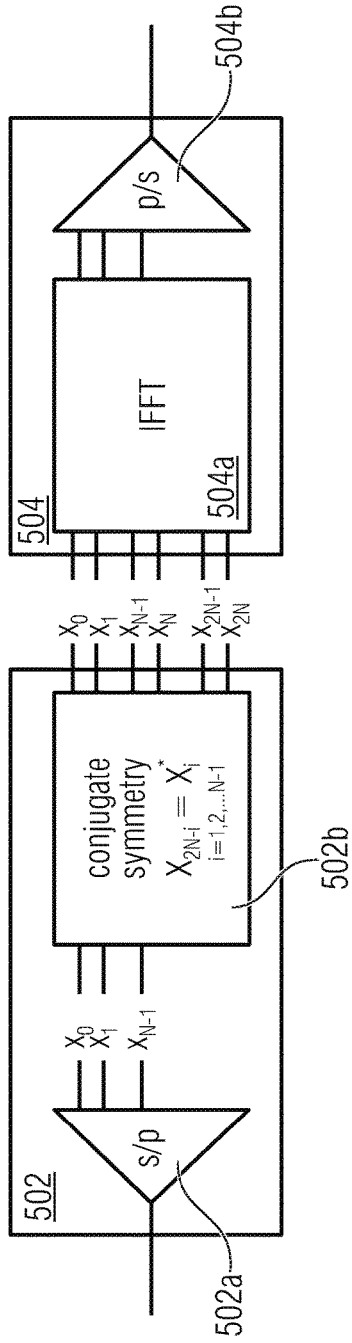
FIG. 4 illustrates the carrier mapping by the carrier mapping block and the IFFT block of FIG. 3.

The carrier mapping may be performed in a way as illustrated in FIG. 4 showing the carrier mapping block 502 and the IFFT block 504 of FIG. 3. The carrier mapping block 502 includes a serial/parallel converter 502a providing the data at the input onto a plurality of subcarriers. The carrier mapping block 502 further includes the conjugate symmetry block 502b receiving from the serial/parallel converter 502a the plurality of subcarriers. To create a real-valued waveform, only half of the subcarriers are used, while the conjugate symmetry is enforced as:

$$x_{2N-i} = x^*_i, i=1,2,\ldots N-1$$

where the star indicates a complex conjugation. At the output of the block 502b the discrete multi-tone (DMT) signal is real-valued, even if the symbols $x_i$ are complex. With regard to FIG. 4 it is noted that the subcarrier xo may be used to add a constant bias signal to the output signal.

The IFFT block 504 includes the actual IFFT 504a operating on the basis of the DMT signal, and the time-domain signal X(k) is given by:

$$X(k) = \frac{1}{2N} \sum_{i=0}^{2N-1} x_i e^{j2\pi \frac{ik}{2N}}$$

where i denotes that sample index, $x_i$ denotes the complex-valued baseband signals in the frequency domain, and 2N denotes the block size of the IFFT. The IFFT block 504 further includes a parallel/serial converter 504b.

Figure 5:
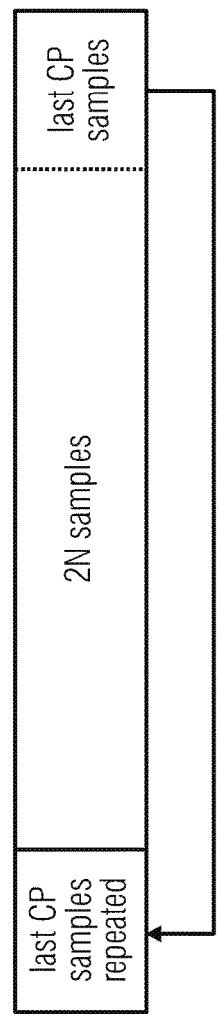
FIG. 5 illustrates the cyclic prefix insertion in accordance with an example.

At the output of the IFFT 504 (see FIG. 3), in the serial block of 2N samples, the last CP samples are copied as a sub-block and are repeated and appended at the beginning of the block of samples, as is schematically shown in FIG. 5 showing the cyclic prefix insertion. By adding the CP at the transmitter, and removing it at the receiver, the multipath channel matrix may be transformed from Toeplitz-shape into a circular-shape which allows the use of the IFFT at the transmitter and the FFT at the receiver to obtain a diagonal channel in the frequency domain so that a simple single-tab frequency-domain equalizer (FDE) may be used.

Figure 6:
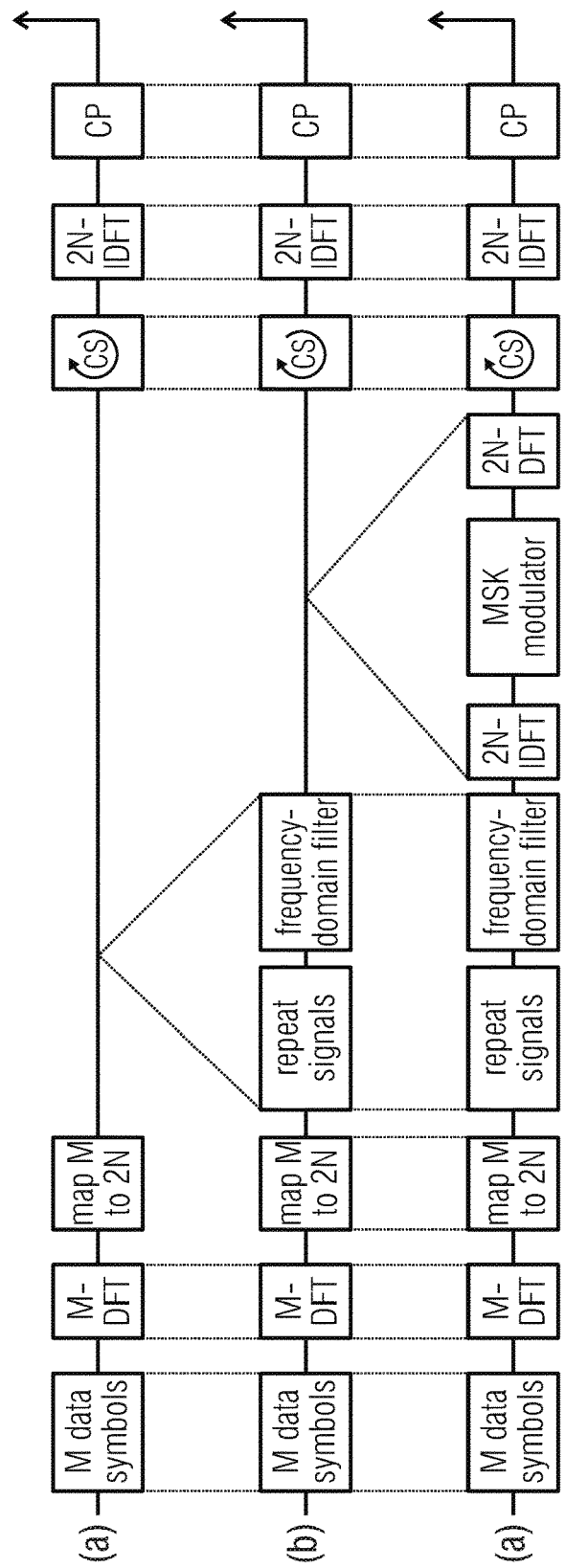

As mentioned above, at the beginning of the processing, an optional precoding 500 may be performed, for example a single-carrier modulation. The precoding before the OFDM modulator may be used to reduce the probability of clipping and to enhance the power efficiency while sacrificing no or minor spectral efficiency. For a single-carrier (SC) transmission, an "outer" pre-coding, together with an "inner" OFDM transmitter is used to emulate SC transmission inside the OFDM concept. This involves little more advanced signal processing, and the same minor increase exists at the receiver, i.e., decoding is straightforward. FIG. 6 shows an example for three single-carrier modulation schemes A to C that may be used to improve the power efficiency of an OFDM transmitter. FIG. 6(a) shows a pure DFT precoding using a roll-off factor $\alpha=0$. FIG. 6(b) shows a root-raised cosine filter that may be added in the frequency domain to realize $\alpha>0$. FIG. 6(c) shows a Gaussian filter and a minimum-shift keying (MSK) modulation be added in the time domain so that a GMSK waveform may be realized inside the OFDM system. Further details regarding the single-carrier modulation may be found in [3] and [4].

In FIG. 6(a), a simple SC transmitter is shown in which, first, the symbol sequence is passed through the M-DFT and mapped directly onto the desired frequency sub-band after using a cyclic shift (CS) so that the DC channel is in the center. Finally, the precoded sequence is passed through the 2N-IDFT and the cyclic prefix CP is added. As is shown in [3], this procedure yields a SC signal having a roll-off factor $\alpha=0$. The rectangular filtering causes a "ringing" in the time domain which increases the peak-to-average power ration (PAPR). This is a special case of the RRC-filtered SC transmission, details of which will be described in the following.

FIG. 6(b) shows an RRC-filtered single-carrier-modulation in which an additional root-raised-cosine filter is introduced in the frequency domain where α≥0. To realize filtering in the frequency domain, oversampling is emulated by repeating the DFT output block in the frequency domain. Afterwards the root-raised cosine (RRC) filter is applied in the frequency domain. The sequence is then mapped directly onto the desired frequency sub-band using a cyclic shift (CS) so that the DC signal is in the center. These steps will now be described in further detail.

A data sequence a(n) of the length M is used, where n=1, 2, . . . M. The sequence is up-sampled by the factor F as follows:

$$b(k) = \begin{cases} a(n) & \text{if } k = F \cdot n \\ 0 & \text{else} \end{cases}$$

with $$F = \left\lfloor \frac{2N}{M} - 0.5 \right\rfloor,$$

where k=1, 2, . . . , F·M and 2N is the number samples in the final waveform without the CP. The notation $\lfloor z \rfloor$ is used to indicate that z is rounded to the nearest integer less than or equal to z which, in Matlab, is the function "floor(z)". F-times up-sampling followed by M-DFT is equivalent to M-DFT and a subsequent spectral repetition, provided that the ratio 2N/M is an integer. The proof of this is given in [3]. Accordingly, the upsampling and 2N-DFT may be replaced by a M-DFT and repeating the output signal in the frequency domain.

The next step is a flexible frequency-domain filter implemented so that the bandwidth may be easily changed as a function of the block size M. A vector is defined with a running index s=[−M . . . M] and the bell-shaped part of the filter is calculated as follows $$G_l = \sqrt{0.5\left(1 + \cos\left[\frac{\pi(|s_l|) - (1-\alpha)\cdot\frac{M}{2}}{\alpha \cdot M}\right]\right)}$$

where l=1, 2, . . . 2M+1. The filter is transparent in the range $$a = \left[M + 1 - \left\lfloor\frac{(1-\alpha)\cdot M}{2}\right\rfloor, \ldots, M + 1 + \left\lfloor\frac{(1-\alpha)\cdot M}{2}\right\rfloor\right]$$

There are two regions where the filter attenuates totally. They are given by $$b = \left[1, \ldots, M + 1 - \left\lfloor\frac{(1+\alpha)\cdot M}{2}\right\rfloor\right]$$

$$c = \left[M + 1 + \left\lfloor\frac{(1+\alpha)\cdot M}{2}\right\rfloor, \ldots, 2M + 1\right]$$

$G_l$ is now set as $G_a$=1, $G_b$=0 and $G_c$=0 in the respective regions indicated by vectors a, b and c. The up-conversion is equivalent to performing sequentially 2N-DFT of the time-domain sequence, a cyclic shift by $N_{center}$ and 2N-IDFT of the shifted signal, as shown in [3].

In FIG. 6(b) the synthesis of the filtered QAM is summarized in the frequency domain. First the data symbol sequence is passed through the M-DFT and the output is repeated in the frequency domain. The signal is then filtered in the frequency domain and the cyclic shift is applied to up-convert the signal to the desired center sub-carrier $N_{center}$. Finally, the signal is passed through the 2N-IDFT and the cyclic prefix is added. In the SC transmitter, the carrier mapping has been modified when compared to the LTE standard and in this way, the waveform becomes comparable to a time-domain single-carrier signal, as is outlined in [3] and the new mapping is illustrated in FIG. 7.

Figure 7:
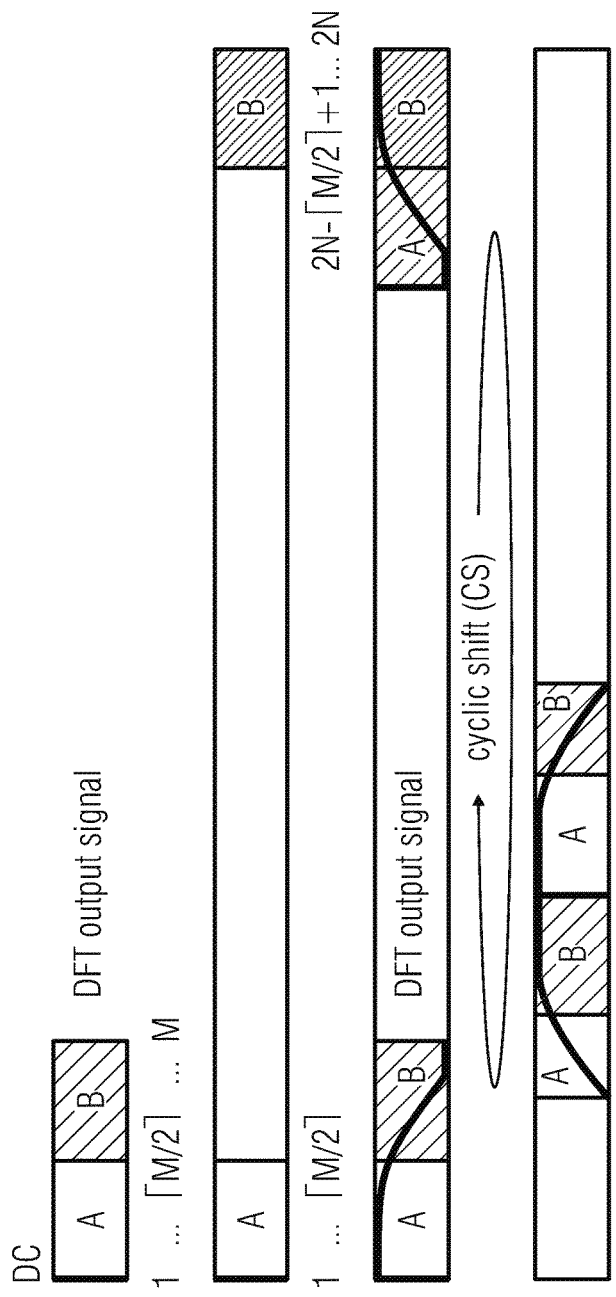
FIG. 7 illustrates the generation of filtered single-carrier signals in accordance with an example.

FIG. 7 shows that the direct current (DC) sub-carrier of the M-DFT output vector (having the index 1) is first mapped onto the DC sub-carrier of the 2N IDFT. The two blocks $$A = \left[2 \ldots \left\lceil\frac{M}{2}\right\rceil\right] \text{ and } B = \left[\left\lceil\frac{M}{2}\right\rceil + 1 \ldots M\right]$$

are then mapped onto the first and last sub-carrier and periodic replica are added in the frequency domain to emulate up-sampling. Finally, the frequency-domain filter is applied and the cyclic shift is used to modulate the signal onto the center subcarrier.

The Gaussian minimum shift key (GMSK) described with reference to FIG. 6(c) is known for zero PAPR in radio links. Although this is not reached in OWC links due to the real-valued waveform, GMSK offers ultra-robust signaling in case of very low SINR. As is shown in FIG. 6(c), first, the classical time-domain GFSK single-carrier transmitter is reviewed. The serial data symbol sequence a(n) is upsampled as described above with respect to the single-carrier modulation yielding b(k). After applying a Gaussian filter in the time domain, the filtered signal c(k) is obtained. The classical Gaussian filter is approximated in the time domain using a finite impulse response (FIR) with some memory. Next, c(k) is passed into a minimum shift keying (MSK) modulator where it is first accumulated yielding the phase $$\varphi(k) = \varphi(k-1) + \frac{\pi}{2F}c(k-1)$$

and then inserted into the complex amplitude $x(k)=I+jQ=\cos(\varphi(k))+j\cdot\sin(\varphi(k))$ The in-phase signal I and the quadrature signal Q are fed with the same phase, but, when up-converting the sequence to the desired center frequency, a shift of 90° is present yielding a single side band (SBB) modulation. This may be performed using an analog IQ modulator. The same SSB up-conversion may be reached by means of digital signal processing. The complex-value GMSK baseband is multiplied sample-by-sample with a digitally synthesized complex-valued oscillation due to the single OFDM subcarrier, which is the center frequency of the desired GMSK-modulated signal. Finally, a window of length M is applied in the time domain.

The equivalent processing for GMSK using OFDM is summarized in FIG. 6(c). As before, the data sequence a(n) is fed into the M-DFT and upsampling is emulated by repeating the output signal in the frequency domain. A Gaussian filter is then applied in the frequency domain. A vector is created with a running index s=[−R . . . , R)] where R≤M, and the filter is determined as follows:

$$G_n = e^{-\beta^2 \cdot s_n^2}, \text{ where } \beta = \sqrt{\frac{\ln(2)}{2} \cdot \frac{1}{M \cdot BT}}$$

where n=1, 2, . . . 2R+1 and BT is the bandwidth-time product. For example, BT=0.3. GMSK is a non-linear SSB phase modulation. Thus, the two functions of accumulating the signal and generating the in-phase and a quadrature signal may be realized in the time domain. The inventive approach is to insert the GMSK modulator after a frequency-domain filtering, but in the time domain. Using M-IDFT of the filter data sequence, c(k) is obtained. Next, c(k) is normalized to a unit peak amplitude and fed into the time-domain MSK modulator mentioned above. The up-conversion is applied and finally the CP is added.

The GMSK causes adjacent channel interference since the SSB phase modulation is a non-linear process. Even if the GMSK modulator input is confined in the frequency domain, four-wave mixing between in-band sub-carriers creates an out-off-band interference which may be cut using an optional post-modulation filter in the frequency domain attenuating totally outside the range S=[−R, . . . R] and correct the power, accordingly.

The above waveforms yield complex-valued sequences. As in the adaptive OFDM approach, the complex-valued waveform covers only the first N-subcarriers and then Hermitian symmetry is needed to generate a real-valued waveform which is achieved by the conjugate symmetry as $x_{2N-i} = x^*_i$, i=1,2, . . . N−1

The resulting discrete multi-tone (DMT) signal is real-valued, even if the symbols $x_n$ are complex.

Figure 8:
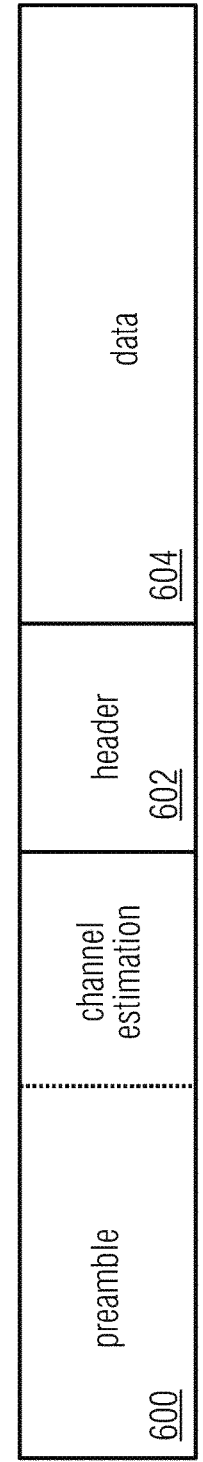
FIG. 8 shows an example of the frame structure as used in accordance with embodiments of the inventive approach.

FIG. 8 shows an example of the frame structure as used in accordance with embodiments of the inventive approach. The frame structure includes the preamble 600 that may be used for a core synchronization and for channel estimation. The preamble may be in the form of the coax mode as defined in the G.hn standard. An optimization may be performed for an operation at a low SNR, and the final OFDM symbol in the preamble may be used for channel estimation. The preamble enables the receiver to decode both the header 602 and the data section 604, for example in a SISO (Single Input Single Output) mode. The header 602 carries control information, like information for setting up the link and for decoding the data. Optionally, the above described pre-coding may be performed for the optimization at the low SNR. The header may use the same numerology like in the last symbol in the preamble 600, and the header information is transparent and may be defined by the MAC layer. The data section 604 may include additional reference signals to be used for MIMO and for correction of the sampling frequency offset (SFO).

FIG. 9 shows an example table indicating for different light sources the respective parameters as they may be used when applying the adaptive OFDM PHY in accordance with embodiments of the present invention. The numerology used in the high bandwidth mode is shown in the table of FIG. 9. It is based on specification used for transmissions in the G.hn standard. A variable bandwidth is used, while maintaining the same CP length and the same subcarrier spacing for all transmission modes. This allows addressing the wide range of use cases and the span of data rates indicated above, namely the span from 1 Mbit/s to 10 Gbit/s. For the peak and minimum data rates it is assumed that all subcarriers are also loaded with data using the modulation schemes with the highest and lowest rate per subcarrier and the highest or lowest code rate is used, respectively. According to the adaptive bit-loading, eventually, a reduced number of sub-carriers may be loaded only onto which the power will be redistributed, i.e., the minimum data rates may be even smaller. The huge span of bandwidth and modulation and coding schemes that may be used allow the transmitter to adapt the data rate to a huge variation of received power and bandwidth being typical for the OWC channel in mobile scenarios. Even if the rate is adapted, conductivity is maintained in all channel conditions.

In accordance with further embodiments, a MIMO scheme may be used to support diversity and spatial multiplexing so as to improve the performance of wavelength-division multiplexing (WDM) and wavelength-shift keying (WSK) transmission. For two transmitters and two receivers, the signal model for a MIMO transmission on each subcarrier is expressed as follows:

$$y = \begin{pmatrix} y_1 \\ y_2 \end{pmatrix} = H \cdot x + n = \begin{pmatrix} H_{11} & H_{12} \\ H_{21} & H_{22} \end{pmatrix} \begin{pmatrix} x_1 \\ x_2 \end{pmatrix} + \begin{pmatrix} n_1 \\ n_2 \end{pmatrix}$$

where, in general, bold upper case letters describe matrices and bold lower case letters describe vectors. The received signals are denoted as $y_i$, where i=1 . . . $n_{Rx}$ and $n_{Rx}$ is the number of receivers. The transmitted signals are described as $x_j$ where j=1 . . . $n_{Tx}$, and $n_{Tx}$ is the number of transmitters. The channel matrix elements represent the channel gain from the $j^{th}$ transmitter to the $i^{th}$ receiver.

An initial link setup and the header transmission detection are performed in the single-input single-output (SISO) mode in order to improve the reliability of the transmission. The transmission of the preamble and the header is done using all transmitters while the detection may be improved by using a maximum ratio combining (MRC) based on individual estimates of the superimposed channels from all transmitters at each receiver $h_i = \rho_{j=1}^{n_{Tx}} H_{ij}$. The number of used transmitters may be indicated in the header.

In accordance with embodiments, additional channel estimation (ACE) symbols are sent at the beginning of the data field 604 (see FIG. 8) in the PHY frame. The additional channel estimation symbols are defined in the frequency domain and multiple OFDM symbols. Each ACE symbol contains the same sequence of bits on all subcarriers that is only passed through the constellation scrambler. For MIMO, the sequence ($s_m$) contains all 1s, but is multiplied as a whole with a sign taken out of an orthogonal sequence. For one transmitter Tx the channel estimation symbol in the preamble is used:

1 Tx: [{sn}]

For two transmitters, the first symbol and one ACE symbol are sent as

2 Txs:
Tx1 [{sn}{sn}],
Tx2 [{sn}{−sn}].

where the first symbol is contained in the header and only one additional symbol is sent for the ACE. The scheme may be extended to four and eight transmitters as follows:

4 Txs:
Tx1 [{sn}{sn}{sn}{sn}]
Tx2 [{sn}{-sn}{sn}{-sn}],
Tx3 [{sn}{sn}{-sn}{-sn}],
Tx4 [{sn}{-sn}{-sn}{sn}].
8 Txs:
Tx1 [{sn}{sn}{sn}{sn}{sn}{sn}{sn}{sn}]
Tx2 [{sn}{-sn}{sn}{-sn}{sn}{-sn}{sn}{-sn}],
Tx3 [{sn}{sn}{-sn}{-sn}{sn}{sn}{-sn}{-sn}],
Tx4 [{sn}{-sn}{-sn}{sn}{sn}{-sn}{-sn}{sn}].
Tx5 [{sn}{sn}{sn}{sn}{-sn}{-sn}{-sn}{-sn}]
Tx6 [{sn}{-sn}{sn}{-sn}{-sn}{sn}{-sn}{sn}],
Tx7 [{sn}{sn}{-sn}{-sn}{-sn}{-sn}{sn}{sn}],
Tx8 [{sn}{-sn}{-sn}{sn}{-sn}{sn}{sn}{-sn}].

In accordance with embodiments, several transmission modes exist that may be used to operate a MIMO link. The main object is to enable a dynamic tradeoff between spatial diversity and spatial multiplexing so that the best number of streams is selected to maximize the throughput and to operate the link reliably. It is assumed that the MIMO link will be operated adaptively in a bidirectional closed-loop manner and that MIMO metrics reports regarding the forward link are provided over the reverse link.

A MIMO transmission having full channel information conveyed from the receiver to the transmitter may be described as follows. The transmission on each subcarrier may be formulated in the frequency domain as $$y_n = H_n x_n + v_n$$

where the ($n_{Tx} \times 1$) vector $x_n$, contains the signals transmitted from all transmitters at the OFDM subcarrier with the index n. The ($n_{Rx} \times 1$) vectors $y_n$ and $v_n$ contain the received signals and the noise, respectively. The integers $n_{Tx}$ and $n_{Rx}$ denote the numbers of transmitters and receivers, respectively. The ($n_{Rx} \times n_{Tx}$) matrix $H_n$ denotes the channel matrix for the subcarrier n with a channel coefficient between each transmitter and each receiver. It is related to the time-domain channel impulse response matrices $H_l$ as $$H_n = \sum_{l=0}^{L-1} H_l \exp\left(-j2\pi \frac{nl}{N}\right)$$

where L denotes the number of resolved multi-paths. Based on full channel state information (CSI) at the transmitter and at the receiver, the channel capacity is approached asymptotically by performing a singular value decomposition (SVD) of $H_n$ of each subcarrier, $$H_n = U_n D_n V_n^H$$

which gives the matrices $V_n$ and $U_n$ containing the Eigenvectors of the channel matrix in the transmit and receive spaces respectively.

The diagonal matrix $D_n$ contains i=1 ... min($n_{Tx}$, $n_{Rx}$) singular values $\lambda_i^n$, referred to as the amplitude gains of the spatial Eigenmodes. The superscript H denotes the conjugate transpose of a matrix. In the information theory, the capacity is asymptotically approached for infinite N by a joint water-filling across all spatial Eigenmodes i and all sub-carriers n. Unlike in the information theory, in practice discrete instead of continuous modulation alphabets are used. A joint bit-loading and power allocation algorithm is used with an individual modulation on each Eigenmode and each sub-carrier, according to the current channel state, so that optimization criteria, like throughput, fairness, stability of queues, may be fulfilled.

The transmitted signal vector $x_n = V_n d_n$ is obtained from the data vector $d_n$ and the spatially multiplexed data signals are reconstructed at the receiver as $\hat{d}_n = D^{-1} \cdot U_n^H y_n$. The noise in each stream is boosted differently, according to the singular value for each stream.

Depending on the availability of the CSI, there are modifications. When the CSI is available only at the receiver, no pre-processing is applied. Assuming additionally linear detection which involves a simple matrix-vector multiplication, the transmitted signals on each sub-carrier may be reconstructed using the minimum mean-square error detector given by the formula $$\hat{x}_n = (H_n H_n^H + \sigma^2 I)^{-1} H_n^H y_n$$

where I and $\sigma^2$ are the ($n_{Tx} \times n_{Tx}$) identity matrix and noise variance at one receiver, respectively.

Figure 10:
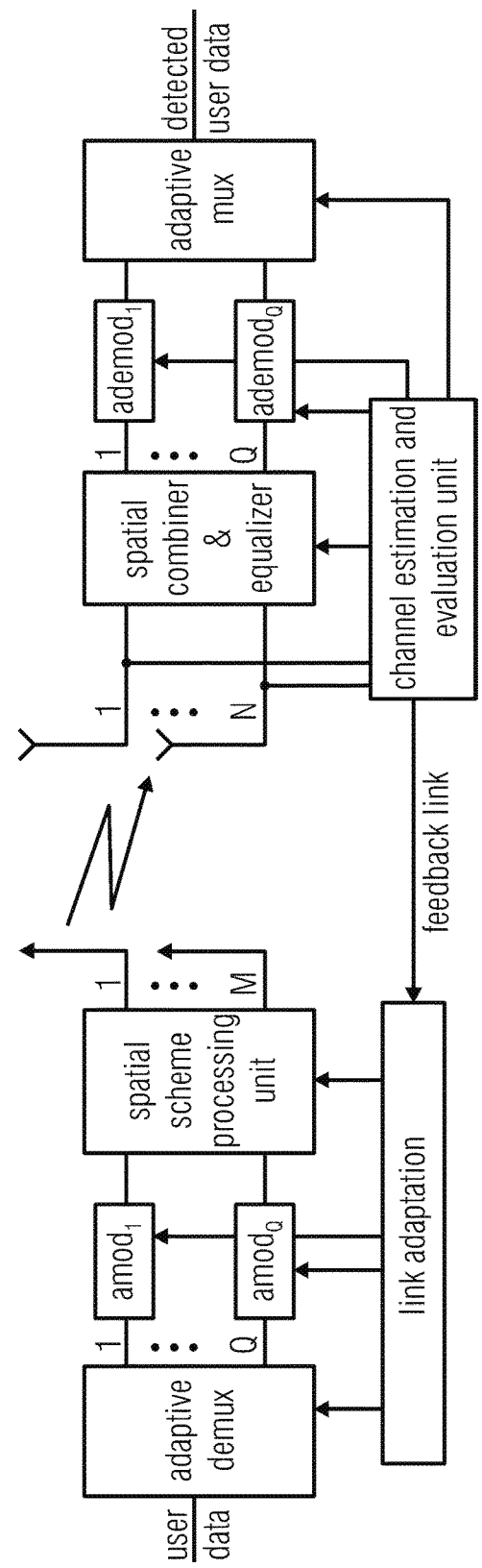
FIG. 10 illustrates an embodiment for implementing an adaptive MIMO transmission by introducing a special processing both at the transmitter and the receiver.

FIG. 10 illustrates an embodiment for implementing an adaptive MIMO transmission by introducing a special processing both at the transmitter and the receiver. Moreover, a variable number of streams is used because in some cases, dependent on the time-variant optical wireless channel, a high capacity is reached with a reduced number of streams. For instance, if a LED is directed away from the receiver, this LED is hardly useful for transmission and may be switched off. User data is de-multiplexed using Q parallel data streams, where Q is an integer ranging from 1 to $n_{tx}$. The data in each stream is transported using an individually selectable modulation scheme on each subcarrier, in order to maximize the throughput, which is also denoted as a per-stream rate control. All active streams are then passed through a spatial scheme processing unit, in which channel knowledge obtained over the reverse link, is used to identify the best spatial pre-processing of all streams transport and in parallel. The MIMO channel rank may vary over time and also as a function of the subcarrier index n. Accordingly, as an extension of the adaptive OFDM approach, the selection of the best MIMO transmission mode is done for each subcarrier or for a group of subcarriers. The following MIMO transmission modes may be used:

(a) Spatial repetition code: Only one stream is transmitted and received over all LEDs and PDs, respectively. This mode is useful, e.g., in order to create an omnidirectional transmitter characteristics. This may be reached using the precoding vector $v_n = (1\ 1\ 1\ 1\ \ldots\ 1)^T$.

(b) Transmitter selection: In order to save energy, modulation may be switched off for some LEDs, which results in zeros at the respective positions in the precoding vector $v_n$.

(c) Receiver selection: When only one stream is transmitted using multiple LEDs, maximum ratio combining (MRC) is advantageous. This involves an ADC at each receiver as well as multiple FFTs. Often, few links in the MIMO channel have free LOS and a reduced path loss, accordingly, and for all modulation frequencies. Hence, the channel matrix is "sparse". For reduced complexity, it may be sufficient to select the strongest received signals and to combine them using equal gain combining (EGC). This may be realized already in the analog domain so that fewer ADC are sufficient.

(d) Combined transmitter and receiver selection: There may be a combination of transmitter and receiver selection.

(e) Transmitter and receiver selection for multiple streams: The above two schemes may even be combined with multi-stream transmission as long as the number of streams Q is equal or smaller than the minimum of the numbers of active transmitters and receivers. At the receiver side, the residual cross-talk is then reduced by multi-stream processing.

(f) WDM transmission: For WDM, because different colors are used, normally the number of streams is the same as the number of transmitter ports. In this case, multiple streams are transmitted in parallel and the precoding matrix on all subcarriers is given by $V_n=1_n$. Because color separation behind the receiver filters may be imperfect, MIMO reference symbols may be transmitted, and MIMO channel estimation and processing may be performed in order to reduce the residual cross-talk and to increase the spectral efficiency.

(g) WSK transmission: For WSK transmission, e.g. in case of an RGBY LED, the precoding vector $v_n=(a_R\ a_G\ a_B\ a_Y)^T$ is used. If MIMO reference symbols are transmitted, imperfect color calibration at the transmitter, which could also be falsified by reflecting surfaces, may be compensated by MIMO processing at the receiver side.

Figure 11:
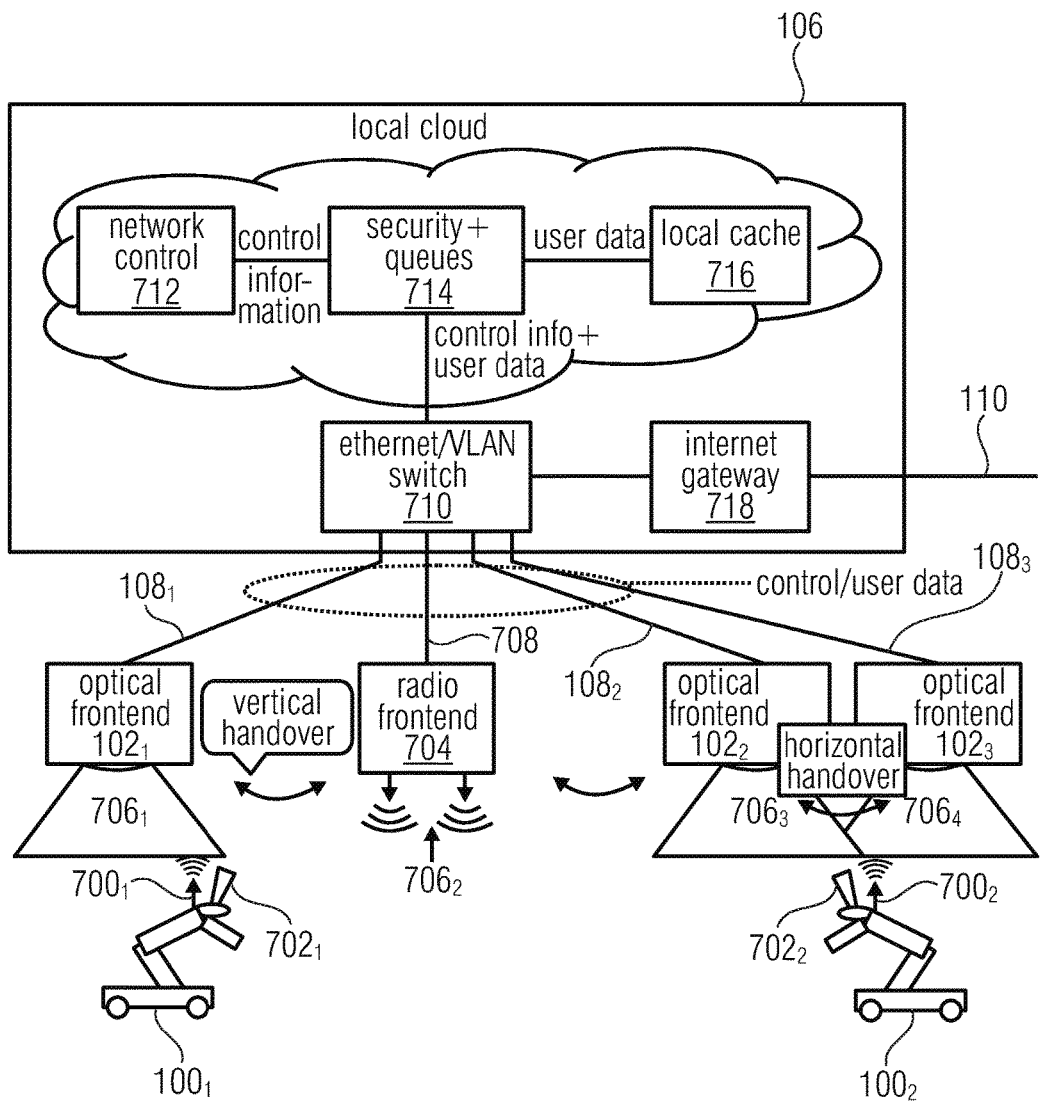
FIG. 11 shows an example for a high-rate PD network architecture as it may be used, for example, in an industrial environment.

FIG. 11 shows an example for a high-rate PD network architecture as it may be used, for example, in an industrial environment. In a similar way as described with reference to FIG. 1(c), FIG. 11 shows a plurality of user devices $100_1$, $100_2$, for example self-propelled robot devices used in an industrial production environment. The UDs $100_1$ and $100_2$ may comprise antennas $700_1$, $700_2$ so as to allow for a communication via a radio channel as well as optical transceivers $702_1$ and $702_2$ allowing for an optical wireless link. The access points include three optical frontends $102_1$ to $102_3$. In addition, a radio frontend 704 for providing a wireless radio channel to the UDs $100_1$ and $100_2$ may be provided. The areas covered by the respective frontends are schematically indicated at $706_1$ to $706_4$. Further, in FIG. 11 both a vertical handover and a horizontal handover are indicated. The vertical handover is indicated with respect to user device $100_1$ meaning that the user device leaves the coverage area $706_1$ of the optical front and $102_1$ and approaches the coverage area $706_2$ of the radio frontend 704 so that the vertical handover means that the communication is switched from the optical wireless communication to the radio based wireless communication. With regard to user device $100_2$ it is assumed that it is about to leave the coverage area of frontend $102_3$ so as to enter the coverage range $706_3$ of the frontend $102_3$ so that a handover between the frontend $102_3$ and $102_2$ is needed and since both are optical frontends, this handover is referred to as a horizontal end over as the transmission remains within the optical domain.

The frontends are coupled to the coordinator 106 via the respective links $108_1$ to $108_3$, and also the radio frontend 704 is coupled via the link 708 to the coordinator 106. The coordinator 106, in the depicted example, includes an Ethernet/VLAN switch 710 to which the respective connections 108 and 708 are coupled. The switch 710 is further connected to a network controller NC including the network control block 712, a security and queues block 714 and a local cache 716. Further, the switch 710, via the internet gateway 718, is connected to the internet, as is indicated by line 110. The coordinator 106 provides a central control implementing the security, HARQ, FEC features for the communication with the user devices as well as the features that may be used for performing a handover and for performing interference coordination. The network may be the Ethernet and the optical wireless frontends may include light emitting diodes, photodiodes, analog frontends and the like and implement the PHY and MAC layers described above. The optical wireless terminals $100_1$, $100_2$ interface via the optical frontends to the central control 106 for a coordinated transmission, if desired, and the PHY and MAC layers also provide for a stand-alone link.

The coordinated wireless network (COW) architecture shown in FIG. 11 deploys multiple APs $102_1$ to $102_3$, 704 so that continuous coverage is reached for mobile optical wireless user devices $100_1$, $100_2$ in a desired service area. The coverage areas 706 are overlapping areas allowing for a horizontal handover from one AP to another AP. There are also non-overlapping areas where a vertical handover to another wireless technology is provided. In the following, further details regarding the coordinated wireless network having overlapping coverage areas is described.

In a similar way as in the MIMO mode, an initial link setup and header transmission detection are performed in a single-input single-output mode so as to improve the reliability of transmission. The transmission of the preamble and the header is done over all transmitters of all APs and channel estimation symbols used by different APs are made orthogonal with each other which may be reached by assigning a different comb of subcarriers to each AP that is shifted in the frequency domain by integer multiples of the subcarrier space in dependent on the AP, and it is assumed that the receiver is capable of interpolating the channel between the used subscribers and the comb. The header detection may be improved by using maximum ration combining (MRC) based on individual estimates of the superimposed channels from all transmitters at each receiver $h_i = \Sigma_{j=1}^{n_{Tx}} H_{ij}$ and a list of APs in the jointly served area is included in the header, together with the assigned comb shift.

Figure 12:
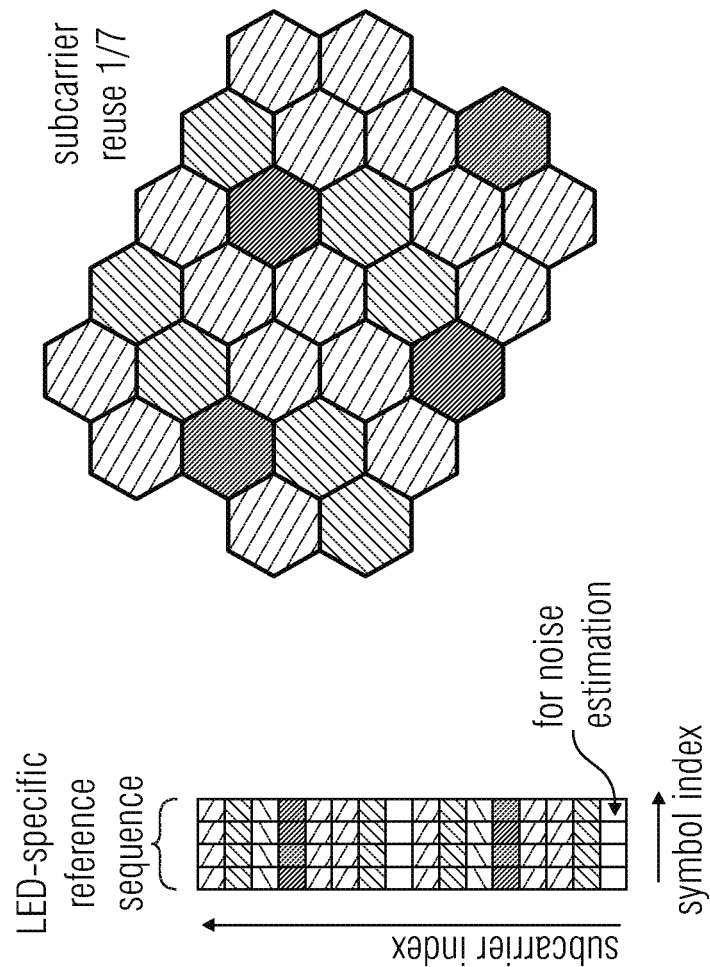
FIG. 12 shows an embodiment for additional channel estimation symbols that may be used in a coordinated wireless network.
Figure 12:
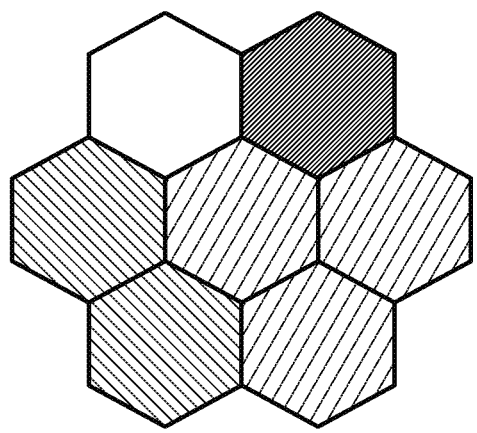

FIG. 12 shows an embodiment for additional channel estimation symbols that may be used in a coordinated wireless network. In the center of FIG. 12 multiple ACE symbols are shown and each LED at a given access point transmits another sequence. Subcarriers marked with the same color are assigned to the same access point and subcarrier combs may be reused after a certain distance. The assignment of the ACE symbols may be defined and changed dynamically by the network management, for example if a new AP is added to the network. To identify different APs in a COW topology and to maintain the possibility to use MIMO at each AP, the channel estimation symbols for different APs are made orthogonal in the frequency domain. During the entire channel estimation block, each AP is assigned another comb of subcarriers and using a comb of subcarriers, instead of all subcarriers, is possible because only as many subcarriers are needed for channel estimation as there are tabs in the CP, in order to identify all multi-paths.

ACE signals may be sent twice in the COW topology. In the first period, also denoted as cell-specific AC (CS-AC), the ACRE sequence is sent directly from more transmitters so that the physical channel matrix H is estimated on each subcarrier. This information may be used for joint transmitter optimization, after the AP received the estimated CSI via feedback from its UDs. In the second period, also denoted as user-specific ACE (US-ACE), the ACE sequence is passed through the transmitter optimization before being transmitted. The joint transmitter optimization may depend on the channel of other UDs attached to other APs as well. By using US-ACE the UD may estimate the modified effective channel matrix H effective and adapt it receiver processing accordingly.

As mentioned above, the frame also includes payload data. In front of the OFDM modulator of the transmitter (see FIG. 2), the payload data is scrambled and fed into the forward error correction and then mapped onto constellation points. The processing of payload data may be performed in accordance with the G.hn standard, to which reference is made with regard to the processing of payload data.

In the embodiment of FIG. 11, the network-layer functions are supported by information received from the PHY layer described above. More specifically, the PHY provides cell-specific reference signals (SRS) that may be reused at distance cells, as assigned by the central controller. A user device or terminal subscribes to the strongest cell within its range and establishes a link at the PHY and MAC level by using a primitive and most reliable signaling. The central controller decides what cell is serving and how it transmits and coordinates the interference in adjacent cells, provides user specific reference signals (URS), measures EVM including interference coordination and provides URS feedback and adapts the transmission mode by which data is sent/received via the serving cell. The following metrics are provided in accordance with the embodiment of FIG. 11: the signal strengths of the strongest cells for allowing for the initial links setup and the best-cell selection and handover and for allowing for a primitive initial signaling, the results of which are passed via the Ethernet/IP protocol to the central controller. Further, metrics regarding the EVM versus frequency for each terminal are provided on the basis of the URS for an adaptive transmission. The URS feedback is directly used inside the MAC in standalone links or is transferred via the Ethernet/IP to the CC for coordinated transmission. Further metrics provide channel information for the strongest cells based on CRS, which are only used for a coordinate transmission, and the CRS information may be transmitted over a CRS feedback channel which is orthogonal from other cells and is then passed via static Ethernet/IP to the CC.

Thus, embodiments of the invention are based on the insight that an optical wireless link has a real-valued non-negative channel and, assuming that a sufficiently high constant bias current is applied, the optical wireless channel may be modeled as real-valued multipath channel with additive white Gaussian noise. Accordingly, similar algorithms like for mobile radio transmission may be applied, if they are applied so that a real-valued waveform is realized. In case that multiple such links with overlapping coverage are used, there is inter-cell interference. Cooperative transmission algorithms may be applied. An optical wireless transmission uses the baseband, i.e. there is no carrier frequency offset between transmitter and receiver. Moreover, time variance due to the mobility of the user is reduced compared to radio. The mm-wave links (60 GHz) addressing similar application scenarios do have very high Doppler frequencies which make efficient interference management impractical, because of the unavoidable feedback delay. Hence, even if there is plenty of spectrum at these frequencies, it cannot be as efficiently used. The mobility management which is responsible for handover and interference coordination, is important for achieving a low latency, that is needed e.g. for closed-loop wireless control applications in an industrial automation scenario and also in a vehicular scenario. An optical wireless transmission has a key advantage compared to radio, in that it cannot be jammed by RF signals.

The proposed solution is to adopt the Cloud Radio Access Network (C-RAN) architecture discussed for mobile radio, also for optical wireless communications. Industrial production halls or homes will have central points where signals of all light sources, being considered also as wireless access points, come together (i.e. at the common fuse box in homes or at certain aggregation nodes like switches and routers in the common IT infrastructure). The idea of C-RAN is to place the involved central control (CC) functionality for handover and interference management in these natural network nodes. This is similar like in a local cloud, where also the user data may be stored. Note that even data processing is possible at the locations, as the CC may be connected a higher speed to the switch or router compared to the frontends. Hence, multiple signals for multiple frontends may be jointly processed.

Assuming that the optical frontends deliver the needed information to the CC, via the existing network paths, as the CC is located nearby the wireless frontends, so that ultrafast interference coordination becomes possible if the users are mobile and the channel to serving and interfering cells change quickly.

For low-latency handover it is also needed that the data path changes instantaneously and that no data is lost during this process.

In accordance with embodiments, the network security is terminated at two ends: in the wireless terminal and in the local cloud. In this way, the signal path though the fronthaul (between the frontend and the cloud) and the wireless link may be protected as one concatenated link. Previous solutions, like in LTE, involved that the security is terminated in the core network, which is typically situated hundreds of kilometers away from the user and thus a moderate latency is possible only. In accordance with other embodiments, the CC, who knows which cell is serving, informs the "security+queues" (S&Q) device in the cloud as well as the wireless terminal via a reliable control channel which frontend is serving at the moment. As soon as it is decided that a whole packet is transmitted over the wireless link, the corresponding "routing" information is stamped at the Ethernet transport layer as a VLAN address into each individual packet. The links from the cloud to the frontends are assumed to be pre-configured in each aggregation node inside the local IT network. By changing the stamp inside the S&Q device, the downlink packet goes another way. Unlike in previous approaches, where cooperative signal processing was managed inside each frontend, this inventive approach is immediately implementable, the system enables seamless mobility in a stand-alone manner independent of external control by the core network. By introducing the centralized controller (CC) placed inside the local cloud (see FIG. 11), all decisions and low-layer routing operations, needed for instantaneous interference management and ultra-fast handover, may be made locally. This ensures that low latency may be achieved for mobile data links without external control from the mobile network core. Moreover, all transport is Ethernet, and only existing low-cost technologies are used. However, the security and queue functionality which applies the stamps to each individual packet according to control information received from the central controller has to be placed inside cloud and inside each mobile terminal. In his way, the essential requirements for industrial wireless networks may be met for the first time.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] TG7r1: Technical Considerations Document, available: https://mentor.ieee.org/802.15/dcn/15/15-15-0492-05-007a-technical-considerations-document.docx
[2] EP 2,434,835 A1
[3] V. Jungnickel, V. Hindelang, T. Haustein, T. Zirwas, SC-FDMA Waveform Design, Performance, Power Dynamics and Evolution to MIMO, DOI: IEEE Portable, March 2007.
V. Jungnickel, L. Grobe, Localized SC-FDMA with Constant Envelope, PROC. Int. Sym. Personal, Indoor and Mobile Radio Systems (PIMRC), IEEE London, UK, September 2013, PP. 24-29.

The invention claimed is:

1. A system for providing an optical wireless communication with a mobile device, the system comprising:
a plurality of optical frontends coupled to a central point, each of the plurality of optical frontends configured to provide for an optical wireless communication with the mobile device; and
a network controller coupled to the central point,
wherein the network controller comprises a data flow control device configured to control the data flow between each of the optical frontends and the central point, the data flow control device being configured to operate responsive to a control signal from the network controller, the control signal indicating which of the plurality of optical frontends serves the mobile device,
wherein an interface from the plurality of optical frontends to the network controller is configured to exchange control signals between the network controller and the plurality of optical frontends,
wherein a plurality of mobile devices communicate with the optical frontends using coordinated links, wherein the mobile devices and the optical frontends estimate the physical interference channel before a coordinated transmission and respective metrics reports are conveyed by the optical frontends to the network controller as an input for the interference coordination and handover, and
wherein, depending on the link situation, the network controller is configured to initiate a handover event by rerouting traffic paths between the network controller and the plurality of optical frontends and to control the transmission of the mobile devices and the optical frontends to minimize an interference.

2. The system of claim 1, wherein responsive to a control signal from the network controller, the data flow control device is configured to comprise or change routing information in a data block or data packet to be transmitted to or received from the wireless device.

3. The system of claim 1, wherein possible links from the central point to the frontends are pre-configured by the network controller in the central point and any intermediate aggregation node.

4. The system of claim 1, wherein the central point is part of a wired network, e.g. a wired computer network, or is part a wired power network.

5. The system of claim 4, wherein the wired computer network comprises one or more aggregation nodes, like a switch or a router, to one or more of which the network controller is coupled.

6. The system of claim 4, wherein the wired computer network is a packet switched network.

7. The system of claim 4, wherein the central point comprises a fuse box.

8. The system of claim 1, wherein the wired network, the plurality of frontends and the network controller are provided within a predefined environment.

9. The system of claim 8, wherein the predefined environment comprises an industrial or commercial area, e.g., industrial or commercial premises or facilities, like an industrial production area, an industrial production hall, a shop, or the like.

10. The system of claim 8, wherein the predefined environment comprises a private area, like a residential area, a private house, a private flat or the like.

11. The system of claim 1, wherein the data flow control device is a hardware device.

12. The system of claim 1, wherein
the network controller is configured to provide security, HARQ, FEC, handover coordination and interference coordination,
the wired computer network operates in accordance with the Ethernet protocol;
each of the wireless frontends comprises analog transceiver elements and is configured to implement the PHY layer and the lower MAC layer of the transmission protocol.

13. The system of claim 1, wherein the plurality of frontends further comprises a radio wireless frontend.

* * * * *